United States Patent [19]

Hoelscher

[11] 3,815,711

[45] June 11, 1974

[54] VANE LOCAL CONTROL SYSTEM FOR ELEVATORS

[75] Inventor: William R. Hoelscher, La Mesa, Calif.

[73] Assignee: Elevator Corporation, Spring Valley, Calif.

[22] Filed: Feb. 8, 1973

[21] Appl. No.: 330,494

[52] U.S. Cl............................................. 187/29 R
[51] Int. Cl............................................ B66b 1/40
[58] Field of Search .............. 187/29; 318/480, 640

[56] References Cited
UNITED STATES PATENTS
2,444,261   6/1948   Kelling............................ 318/640 X
2,657,765   11/1953   Savage................................. 187/29

Primary Examiner—B. Dobeck
Assistant Examiner—W. E. Duncanson, Jr.
Attorney, Agent, or Firm—Brown and Martin

[57] ABSTRACT

A system for controlling the approach or departure of an elevator cab to a floor level. The system utilizes a sensor array of solid state photocells and light emitting diodes to detect the presence of a vane. The vane is positioned to indicate the landing floor level. The sensors are arranged to function in conjunction with a logic system whereby the distance to the floor will be indicated with either direction of approach. The logic system enables multiple use of one or more of the sensors. The signals from the logic system are utilized in conjunction with an electronic motion control system for elevators to command the appropriate velocity at each incremental distance. Upon reaching the immediate vicinity of the floor level, a floor hold system is activated which accomplishes the micro-leveling of the elevator despite changes in load or other disturbances which would tend to move the elevator away from the precise floor level.

6 Claims, 7 Drawing Figures

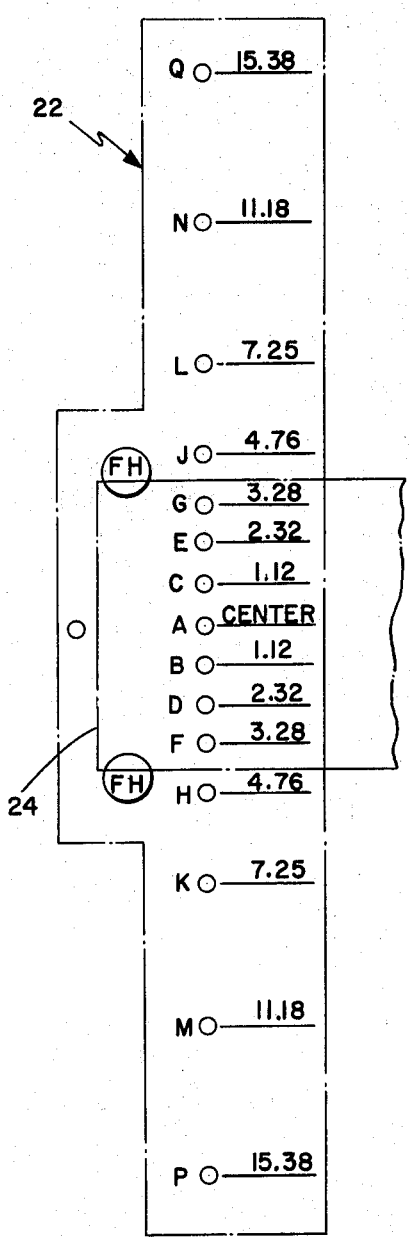
Fig. 5
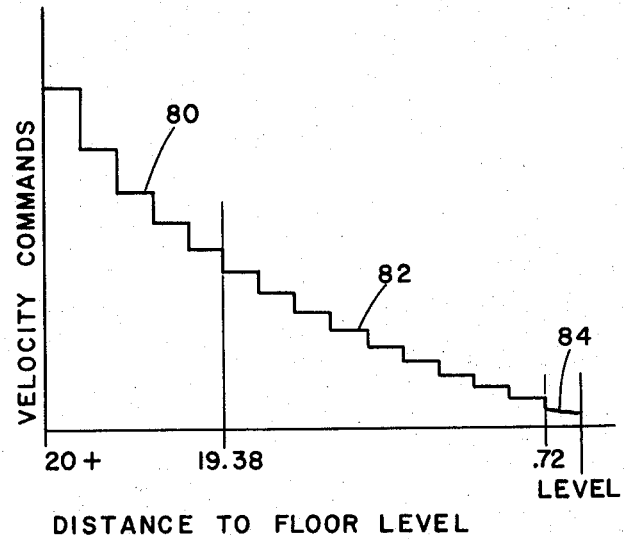
Fig. 6
Fig. 7

VANE LOCAL CONTROL SYSTEM FOR ELEVATORS

BACKGROUND OF THE INVENTION

Modern elevator control systems such as described in the Patent Application entitled "Electronic Motion Control System for Elevators," Ser. No. 169,106 filed Aug. 4, 1971, now U.S. Pat. No. 3,743,055, are capable of considerable precision in the acceleration and initial slowdown phases so that little or no jerking or other unpleasant sensation is experienced by the passengers. However, since the velocity and acceleration characteristics are generated remote from the floor position, these control systems, unaided, are not satisfactory for slowing down and stopping at a floor level. For this reason, various systems have been proposed whereby precise information on the distance to a selected floor will be inputted to the elevator control system. Such information may be provided by proportional sensors, electromagnetic switches, or similar devices in the hoistway. However, prior art systems have been excessively complex and require multiple elements to accomplish the desired information. Further, such systems were subject to wear and other deterioration in service.

It is therefore desirable to have a system for local control over the approach to a floor landing that utilizes a minimum number of parts and is highly reliable in providing accurate distance-to-go information for use in controlling the velocity curve characteristecs, and especially when such system is also capable of providing floor holding functions whereby the precise floor level may be maintained.

SUMMARY OF THE INVENTION

In the instant invention, an array of photocells such as photo transistors are illuminated by light sources, such as light emitting diodes. The diodes and photo transistors are spaced from one another vertically above and below a displaced floor level position or nominal system centerline in such a manner that the paired diodes and transistors form a vertical array with a space for a vane to pass between and interrupt the illumination of each of the photo transistors. The vane is secured to the hoistway in a vertical position which places the center of the vane in the vertical center of the sensor array when the elevator cab is at floor level.

A logic system is utilized in conjunction with the photo sensors so that an absolute value of displacement from the floor level is developed. Thus, the same signal is produced when the vane first interrupts the lowermost sensor as the car approaches the floor from above, as is produced when the vane interrupts the uppermost sensor as the car approaches the floor from below. When the car approaches the floor, the physical height of the vane produces an overlay of a plurality of sensors. This fact is utilized to produce precise distance information in the immediate proximity of the floor. A signal that indicates that the car is 2.88 inches away from the floor, for example, is produced by the simultaneous interruption of sensors on either side of the displaced centerline.

All of the sensors are wired in series with a check sensor positioned so that it will not be interrupted by the vane. Failure of the signal from this sensor is taken as indicating system failure and shuts the system down.

With the elevator cab decelerated to near zero velocity, and near zero displacement from floor level, the electronic elevator control system switches from the deceleration mode to the floor holding mode. For maintaining precise floor leveling, despite variations in the load such as with passengers departing or embarking, the system provides proportional photo sensors and light sources. The lights have a finite diameter that corresponds appropriately to the normal leveling range of the system. These light are spaced by a centerline distance slightly in excess of the vertical height of the vane. Thus, the paired photo sensors are illuminated by the light in the level position. As the car tends to move away from the level position, the vane will cover more of one light and expose more of the other. Thus, the output of the two photo sensors will vary in opposite directions. By the use of a differential amplifier or bridge, this proportional variation is converted to a signal representative of the displacement from floor level. The signal is utilized to command increased or decreased power from the hoist motor to return the cab to the precise level position.

It is, therefore, an object of the invention to provide a new and improved vane local control system for elevators.

It is another object of the invention to provide a new and improved vane local control system for elevators that utilizes a reduced number of parts.

It is another object of the invention to provide a new and improved vane local control system for elevators that has a high reliability.

It is another object of the invention to provide a new and improved vane local control system for elevators that is relatively low in cost.

It is another object of the invention to provide a new and improved vane local control system for elevators that produces precise distance-to-go information.

It is another object of the invention to provide a new and improved vane local control system for elevators that provides precise leveling signals.

Other objects and many attendant advantages of the invention will become more apparent upon a reading of the following detailed description in which like reference numerals refer to like parts throughout and in which:

FIG. 5 is a diagram showing the relative spacing of the sensors.

FIG. 6 is a table of car offset distances detected by various combinations of sensors.

FIG. 7 is a graph of a typical stepped velocity change of an elevator car near a floor.

Figure 1:
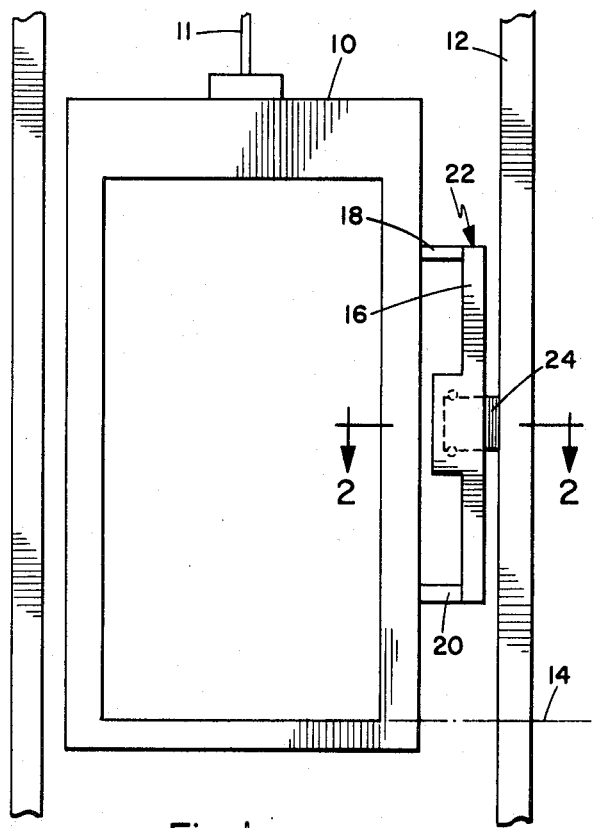
FIG. 1 is a side elevation view of a typical installation on an elevator.

Referring now to the drawings, there is illustrated in FIG. 1 an elevator cab 10, supported from a cable 11, in a hoistway 12. The cab is illustrated at the floor level 14, such that with the doors (not shown) open, passengers could debark from the cab.

A sensor array 22 is supported from the cab by horizontal supports 18 and 20 and vertical supports 16. The vertical supports 16 are spaced so that the sensors will be positioned opposite one another and spaced by a distance sufficient to permit vane 24 to pass between them as the elevator moves in the vertical hoistway 12. The photo transistors 19 are positioned directly opposite paired light emitting diodes 21 so that the photo transistor is normally illuminated by the light emitting diode 21. Therefore, as the elevator passes the vane 24, secured to the hoistway 12 the vane will interrupt the normal light path and produce a signal from the photo transistor 19.

The system is not sensitive to the horizontal alignment of the vane so long as it passes between the photo transistors and diodes. A check sensor including photo transistor 25 and diode 27 is mounted beyond the path of vane 24. The diode 27 is wired in series with the diodes 21. Therefore, a signal from photo transistor 25 will indicate either an obstruction or obscuration affecting the transmission of light or the failure of a diode or power source. The signal from photo transistor 25 is used to shut the system down in such conditions.

Figure 2:
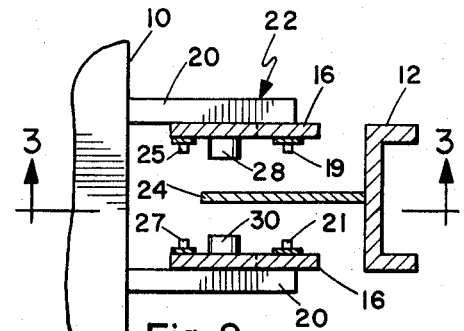
FIG. 2 is an enlarged sectional view taken on line 2—2 of FIG. 1.
Figure 3:
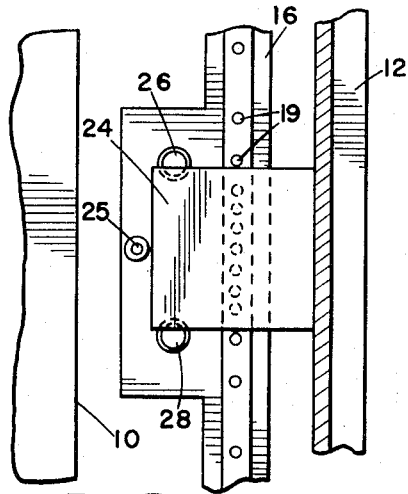
FIG. 3 is a sectional view taken on line 3—3 of FIG. 2.

The vertical supports 16 also carry the floor hold sensor and light array, including the lights 26 and 28 illustrated in FIG. 3. The lights are illustrated as being horizontally displaced from the sensor array 22 to avoid any interference with the functions of that system. As is best illustrated in FIG. 2, the lights 26 and 28 are positioned directly opposite proportional photo sensors 30. The photo sensors 30 produce a signal that is proportional to the intensity of light illuminating their surfaces. Thus, the photo sensors positioned opposite the lights in the position of the vane illustrated in FIG. 3 would be receiving a substantially equal amount of light, and therefore, the signals from the proportional photo sensors would produce a near zero output from a differential amplifier connected in parallel across their output. FIG. 3 illustrates the relative spacing of the bulbs which are placed on centers spaced by a distance slightly greater than the vane vertical dimension. The bulb size (0.625 inch diameter) insures that a portion of both bulbs will be exposed and transmit some light in the normal leveling range of movement (+ or − ⅜ inch). The bulbs are powered from a constant current source set to operate them at approximately one third less than their rated power. This mode of operation insures a long bulb life, however, as further protection the bulbs are wired in series so that both bulbs are extinguished with a failure of either one, to avoid a false indication of an out of level condition. If the cab were to raise slightly from the FIG. 3 position as when a passenger exits the cab, then less light would be received from the light source 26 and proportionally more light would be received from the light 28, creating an imbalance which would be detected and amplified by the differential amplifier, producing a signal that is utilized to command reduced motor power, causing the elevator to descent and return to floor level.

Figure 4:
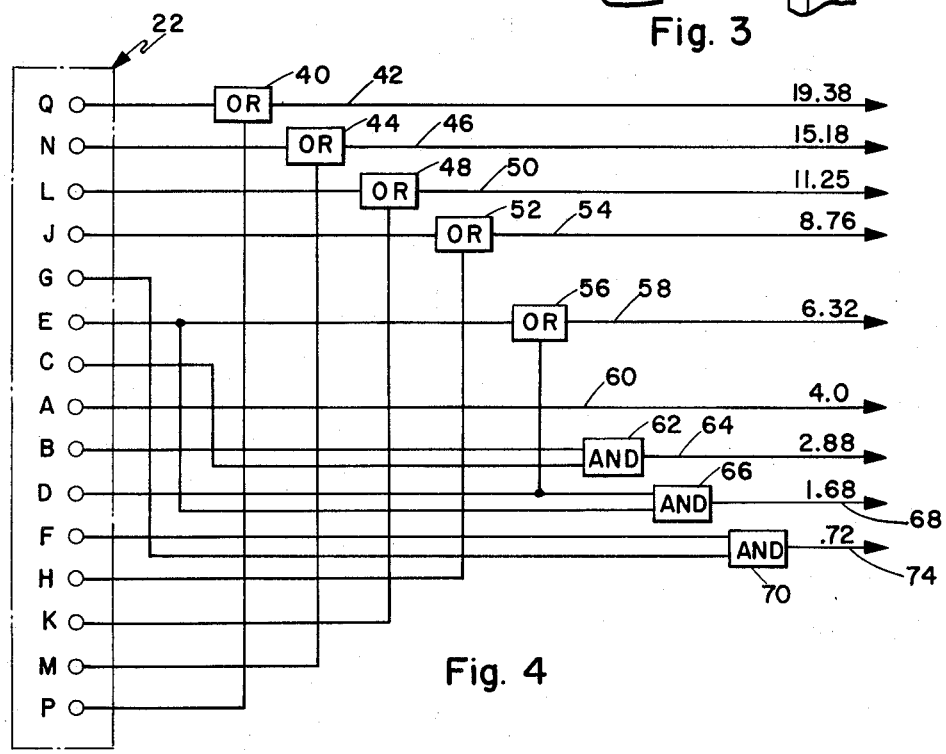
FIG. 4 is a wiring diagram of the sensor interconnections.

Referring now to FIG. 4, the logic system of the invention is illustrated in conjunction with a schematic representation of the sensor array 22. The sensor array is illustrated as comprising a series of spaced photo transistor and photo diode pairs A through P. The absolute spacings of these paired sensors from the nominal centerline are indicated in FIG. 5. However, because of the substantial vertical height of the vane, which is taken to be eight inches in the instant embodiment, the sensors detect a displacement from centerline which is increased by the vane dimension from centerline. That is, in the instant embodiment, the sensors P and Q spaced 15.38 inches from the system centerline would detect a cab displacement from floor level of four inches greater than that displacement or 19.38 inches. The sensors P and Q are connected to an OR gate 40 so that with a cab approaching the floor from above to interrupt the light to and produce a signal from sensor P, or approaching the floor from below and produce a signal from sensor Q, will produce a signal on line 42 which is indicative of an absolute displacement from floor level of 19.38 inches. Further approach to the floor will produce interruption of sensor M or N producing a signal from OR gate 44 on line 46 indicating a displacement of 15.38 inches. The L or K sensor will produce a signal from OR gate 48 on line 50 indicating a cab displacement of 11.25 inches. A signal from sensor J or H will produce an output from OR gate 52 indicating a displacement of 8.76 inches on line 54. A signal from sensor D or E will produce an output from OR gate 56 on line 58 indicating an absolute displacement from floor level of 6.32 inches. The next indication of displacement from floor level is produced from the sensor A which is located precisely at the nominal system centerline and therefore produces a signal when the cab is four inches away on line 60.

It will be noted that the sensors C and B are displaced from the nominal system centerline by a distance of 1.12 inches. Therefore, assuming the cab is approaching the floor from below, the C sensor will be covered up when the cab is 5.12 inches away from floor level, but the B sensor will not also be covered until the cab is 2.88 inches away, therefore AND gate 62 produces a signal which is indicative of this displacement on line 64. As was noted previously, the D and E sensors produce a signal when either sensor is interrupted at 6.32 inches of displacement. However, they also produce a signal from AND gate 66 on line 68 when the sensors are 1.68 inches away. In this manner, dual use is made of the D and E sensors reducing the total number of sensors required. The final distance information utilized in the instand embodiment is provided by the G and F sensors which produce a signal from AND gate 70 on line 74 when the system is 0.72 inches away.

It will be noted, particularly with reference to FIG. 6, that the sensors are spaced by decreasing amounts and that a finer resolution is provided as the elevator cab approaches floor level. This is done in order to produce a finer control over velocity in the immediate vicinity of the floor lever.

Referring to FIG. 7, the transition between a digital selector or other overall position information source to the photo sensor array 22 is illustrated. When the elevator cab is in excess of 20 inches from the floor level, its velocity commands are derived from displacement information from the digital selector. Thus, the car is being commanded to decelerate in the step and fashion illustrated at 80. When the first sensor Q or P is interrupted, the local vane control system is activated, and the appropriate velocity is commanded at spaced intervals corresponding to the spacing selected for the sensor pairs. The stepped volocity commands are indicated by the numeral 82. Also illustrated in FIG. 7 is the transition to the floor level command 84. After the indication from sensors G and F when the car is 0.72 inches from floor level, the control is transferred from the velocity mode to a floor holding mode. At the handoff point, when the final velocity command 84 is initiated, the floor hold sensor will be in such a position that one of the lights 26 or 28 will to totally exposed and the other totally covered so as to produce a maximum indication of an out of level condition. This indication will cause the car to progress toward floor level at the rate consistent with the pre-existing rate so that no jerks unacceptable from a human factor's standpoint will be experienced. As it approaches level, the vane will be in approximately the position illustrated in FIG. 3, wherein a portion of both of the bulbs 26 and 28 are covered, thus causing the illumination reaching the sensors 30 to be equalized, and thereby resulting in a zero velocity command to the elevator cab, holding it a floor level.

OPERATION

In use, vanes 24 would be positioned in the elevator hoistway adjacent to each floor of intended landing. The vertical position of the vane is dictated by the displacement of the sensor array from the floor level 14. Thus, the system centerline may be displaced away from the floor level to provide for convenient mounting of the sensor array on the cab. During operation, the elevator cab speed will be controlled by the central elevator electronic elevator control system, which may include, for example, digital position information whereby a digital number is produced for each incremental position of the elevator cab throughout the entire hoistway. Such information is desirable for generalized control, but does not provide sufficiently precise information for the local control of the cab in an approach to a floor. Thus, as the elevator cab approaches the immediate proximity of the floor level 14, and in the case of the instant embodiment, at a distance of 19.38 inches away from floor level, the vane local control system of the invention will be activated and will thereafter provide a signal at selected distances from floor level. This signal is inputted to the electronic elevator control system to command velocity changes to the correct velocity at that displacement from floor level. While the command produces an incremental change in commanded velocity, the time constant of the signal is such that the velocity descent curve is smoothed out and the steps in velocity are not detectable by the passengers. As the elevator cab approaches the immediate proximity of floor level, the vane local control system will be switched off and control will be handed off to the floor hold sensor system. In the system of the invention the floor hold sensor comprises a pair of incandescent bulbs 28 and 30. These bulbs are positioned spaced from one another by a distance slightly in excess of the total vane vertical dimension so that at the precise floor level position, a portion of each bulb appears over the upper and lower edges of the vane and illuminates with a portion of its total output the proportional light sensors 30. A comparison of the outputs of the sensors 30 by a differential amplifier produces a signal which in sense and magnitude indicates the displacement from floor level. Thus the floor level sensor has sufficient information to command an appropriate change in the drive to the elevator motor system, causing the cab to return to floor level. The use of a constant current source maintaining a current level approximately one third below the rated current level for the incandescent bulbs ensures a long bulb life. However, should one of the bulbs burn out, the series wiring arrangement will produce a failure of both of the bulbs thereby avoiding a false indication of elevator displacement in one direction or the other.

Having described my invention, I now claim.

1. In a system for controlling the approach of an elevator cab to a selected floor level, said system including means for commanding a pre-determined cab speed for discreet intervals of distance away from a floor level of intended landing, motor drive control means for causing a drive motor to operate at said commanded speed, and car velocity sensor means for determining actual car velocity, wherein the improvement comprises:
   a plurality of position sensing means carried on said elevator cab,
   said position sensing means for providing a plurality of discreet signals in response to the elevator reaching a pre-determined distance above or below said floor level,
   said position sensing means comprising spaced radiation emitting and radiation sensing elements,
   vane means mounted in said elevator shaft for interrupting said radiation from reaching successive radiation sensors during the approach of said cab to said floor level,
   logic means for combining the outputs of said sensors close to a position corresponding to the floor level to produce a position output signal only when both sensors are covered by said vane.

2. The system of claim 1 wherein: said position sensing means comprising light emitting diodes and light sensitive solid state devices.

3. The system of claim 1 wherein:
   at least one pair of said position sensing means being utilized by said logic means both to indicate a first distance from floor level when the radiation to only one of said pair of sensors is cut off by said vane means and a second distance from floor level when the radiation to both of said pair of sensors is cut off by said vane means.

4. The system of claim 1 further including:
   floor hold sensor means for providing a signal indicative of the direction said cab is displaced from said floor level.

5. The system of claim 5 wherein:
   said floor hold sensor means comprises a pair of lights having a centerline spacing slightly greater than the vertical height of said vane,
   said lights being positioned so that both lights will be partially exposed and transmit light to sensor elements when said cab is positioned at floor level.

6. The system of claim 1 including:
   check sensor means for detecting failure and interruption of the radiation emitting elements.

* * * * *